United States Patent [19]

Pritchatt

[11] Patent Number: 4,673,198
[45] Date of Patent: Jun. 16, 1987

[54] SEWER PIPES

[75] Inventor: Robert J. Pritchatt, Shelley, England

[73] Assignee: Naylor Bros. (Clayware) Limited, Barnsley, England

[21] Appl. No.: 792,516

[22] Filed: Oct. 29, 1985

[30] Foreign Application Priority Data

Nov. 6, 1984 [GB] United Kingdom ................. 8428037
Mar. 21, 1985 [GB] United Kingdom ................. 8507378

[51] Int. Cl.$^4$ ............................................. F16L 21/02
[52] U.S. Cl. .................................... 285/292; 285/321; 285/915; 285/921
[58] Field of Search ............... 285/291, 292, 321, 305, 285/230, 921, 348, 915

[56] References Cited

U.S. PATENT DOCUMENTS

| 1,947,998 | 2/1934 | Mazza | 285/292 |
| 3,112,939 | 12/1963 | Graham | 285/915 |
| 3,345,085 | 10/1967 | Hanes | 285/321 X |
| 3,637,239 | 1/1972 | Daniel | 285/230 X |
| 3,638,972 | 2/1972 | Alpine | 285/230 X |
| 3,677,581 | 7/1972 | Breitfuss | 285/292 |
| 3,809,413 | 5/1974 | Boisserand | 285/348 |
| 3,858,912 | 1/1975 | Bower | 285/291 X |

FOREIGN PATENT DOCUMENTS

| 1249028 | 8/1967 | Fed. Rep. of Germany | 285/321 |
| 3225901 | 1/1984 | Fed. Rep. of Germany | 285/292 |
| 670660 | 10/1964 | Italy | 285/230 |
| 1113694 | 5/1968 | United Kingdom | 285/321 |

Primary Examiner—Dave W. Arola
Attorney, Agent, or Firm—Abelman Frayne Rezac & Schwab

[57] ABSTRACT

Sewer pipes and connector means therefor whereby they can be connected during pipe jacking or moling, the connector means including a sleeve element and a resilient sealing ring located in a groove in a spigot portion of the sewer pipe, means also being provided to prevent the complete disengagement of the end of a sewer pipe from the sleeve.

6 Claims, 5 Drawing Figures

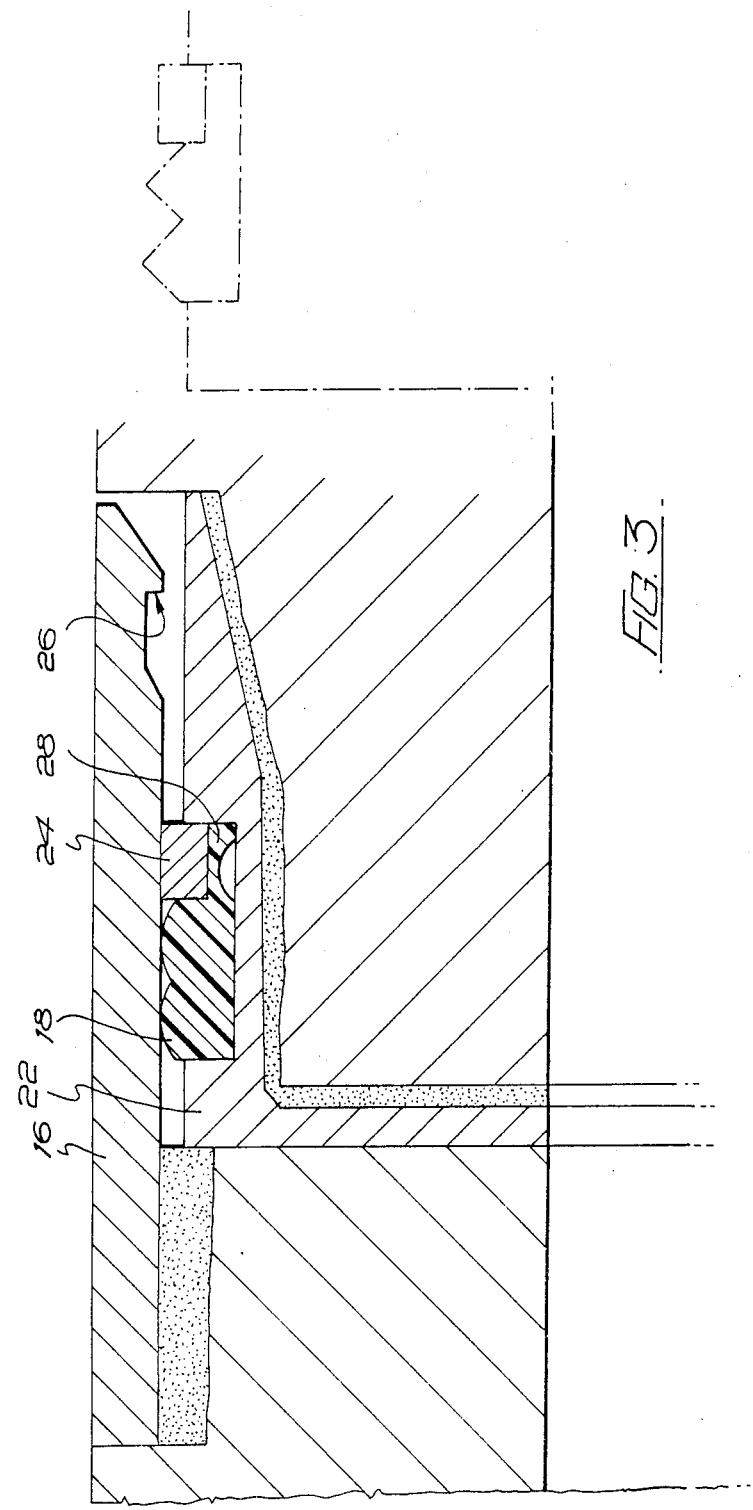

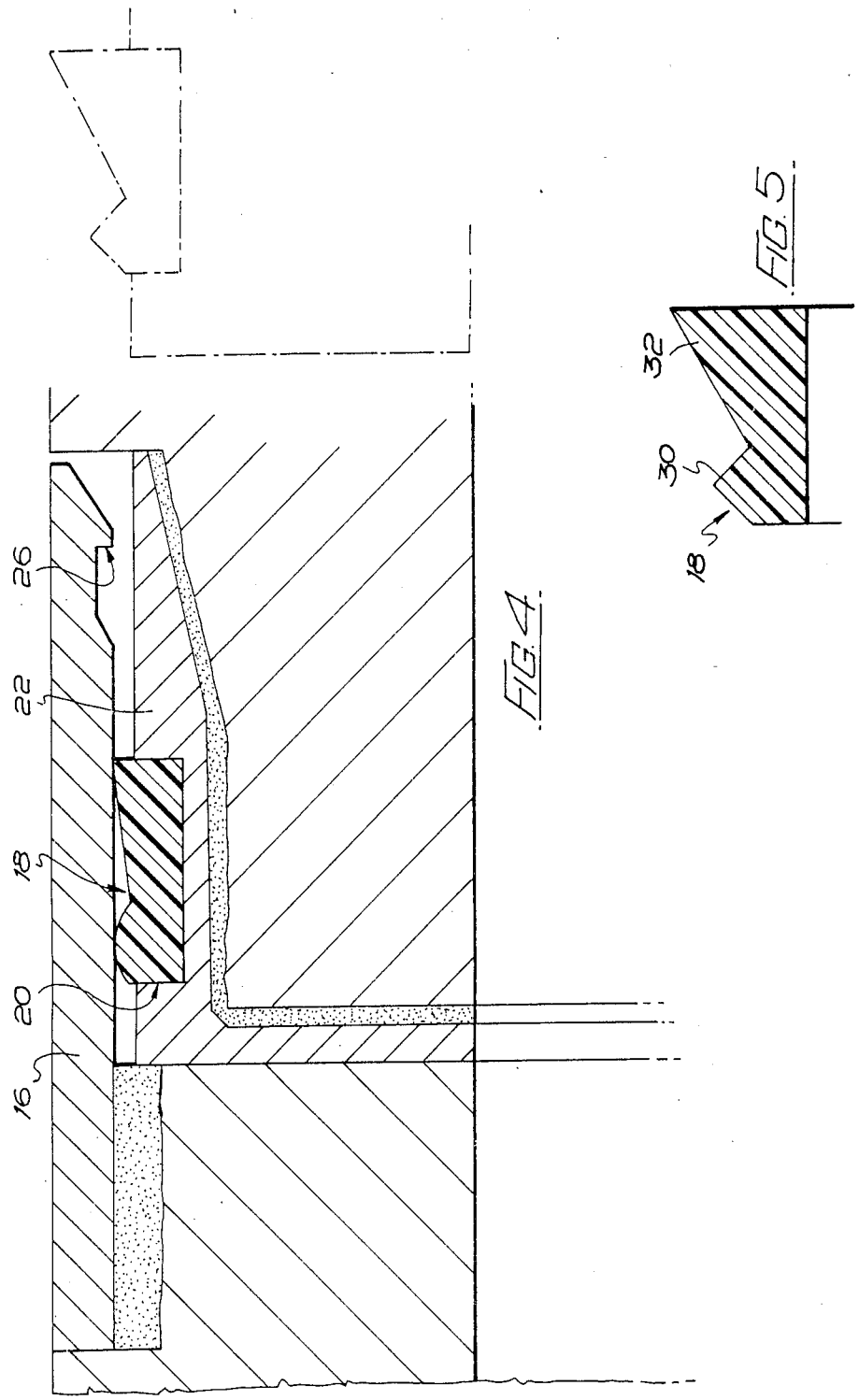

SEWER PIPES

FIELD OF THE INVENTION

The invention relates to sewer pipes (particularly although not exclusively clayware sewer pipes) and connections therefor by means of which sewers can be constructed or re-lined by so-called pipe jacking and moling techniques.

When constructing or re-lining a sewer by pipe jacking or moling an access hole is dug (if not available as an existing manhole) from which successive lengths of sewer pipe can be forced longitudinally by hydraulic pressure or pulled by a mole or winch, each length of sewer pipe being acted upon in turn to urge the connected string of pipes before it. Consequently, the lengths of sewer pipe must be capable of being connected together end to end in a manner which ensures a watertight seal at the connection and in a manner which holds the adjacent ends of the pipes in alignment, whilst the overall diameter of the connector means must not be substantially greater than the diameter of the pipes. In addition, although the ends of each pipe length must be capable of transmitting considerable axial thrust to an adjacent pipe length, the ends of the adjacent pipe lengths must be capable of moving away from each other to some small extent during use without leakage at that point.

Pipes and pipe connectors are known which fulfill the above requirements. However, such pipes and pipe connectors are capable in certain circumstances of becoming disconnected during the jacking operation. If this should happen it would be virtually impossible to ensure their re-connection in alignment and with a watertight seal between the two lengths of pipe concerned.

OBJECT OF THE INVENTION

The invention has for its object to provide such pipes and connector means which will not be capable of becoming accidentally disconnected during the pipe jacking or moling process or during subsequent service.

SUMMARY OF THE INVENTION

According to the invention, there is provided a sewer pipe and connector means therefor whereby a plurality of such pipes can be connected together end to end in a watertight manner during a pipe jacking or moling operation, the connector means including a sleeve element for sealing engagement with a resilient sealing ring located in a groove in a reduced diameter spigot portion of the sewer pipe and including also means capable of becoming engaged with a part of the sleeve element and thereby acting as a detent member to prevent the complete disengagement of the end of the sewer pipe with the adjacent end of a neighbouring sewer pipe to which it is connected. The means capable of becoming engaged with a part of the sleeve element may form an integral part of the resilient sealing ring. Alternatively, such means may be constituted by a length of plastics strip forming a resilient detent ring and be located in the groove in which the resilient sealing ring is located. In this case, the resilient sealing ring may be provided with a laterally extending portion which constitutes a seating for the length of plastics strip forming a resilient detent ring, the arrangement being such that the laterally extending portion of the resilient sealing ring urges the detent ring radially outwards into engagement with the sleeve element. The sleeve element may be provided with an inturned lip against which the means capable of becoming engaged with said sleeve element abuts.

If the sewer pipe is a clayware sewer pipe, the reduced diameter spigot portion may have been machined at one end of the sewer pipe. Alternatively, the reduced diameter spigot portion may be constituted by a synthetic reinforced plastics collar portion encircling a stub portion of the sewer pipe and secured thereon by a suitable adhesive, and in this case the collar portion may overlie the annular end surface of the pipe so that hydraulic jacking forces can be transmitted through it.

BRIEF DESCRIPTION OF THE DRAWINGS

FIGS. 2 to 5 are possible modifications which will be referred to.

DESCRIPTION OF PREFERRED EMBODIMENTS

Figure 1:
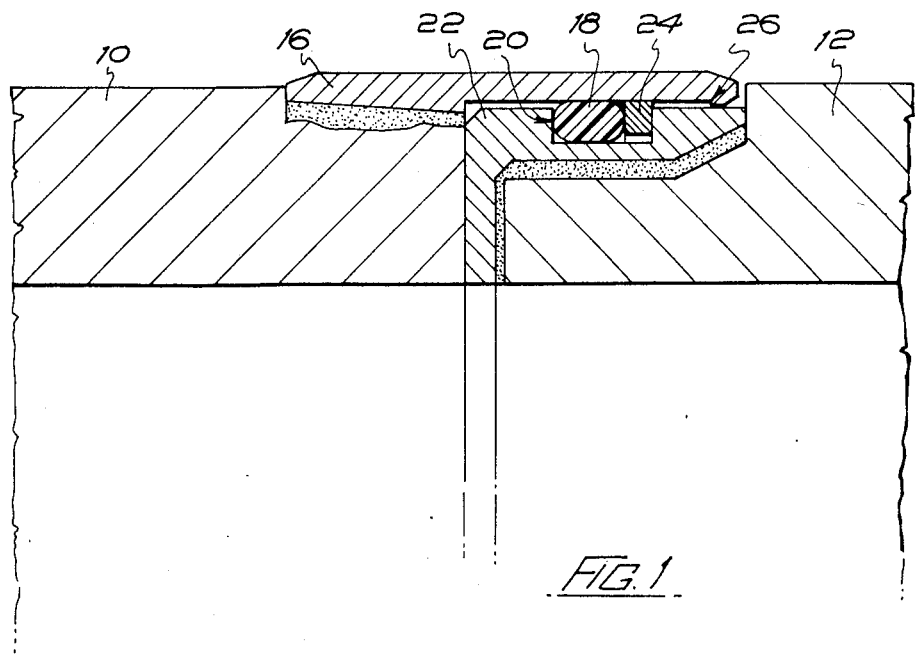
FIG. 1 is a part sectional view of a pair of clayware sewer pipes and connector means therefor embodying the invention.

Referring now to FIG. 1, the adjacent pair of clayware sewer pipes 10 and 12 there illustrated are shown to be connected together by connector means generally indicated 14.

The connector means 14 include a sleeve element 16, the sleeve element in this case being secured to and forming a socket extension of the sewer pipe 10. The connector means also include a resilient sealing ring 18 which is located in a groove 20 formed in a reduced diameter spigot portion of the sewer pipe 12, or more correctly formed in a synthetic plastics collar part 22 which encircles a stub portion of the sewer pipe, having been secured thereon by an epoxy resin. It will be seen that the collar part overlies the annular end surface of the pipe 12.

A resilient detent ring 24 is also located in the groove 20 alongside the sealing ring 18 as shown. The ring 24, which is formed by a length of synthetic plastics strip, is of square or rectangular section and is capable of acting as a detent member to prevent the complete disengagement of the end of the sewer pipe 12 from the sleeve element when it abuts against an inturned lip 26 near the outer end of said sleeve element, that is to say near the end remote from the sewer pipe 10. The ring 24 functions as a detent member if there is any tendency for the connected sewer pipes to move apart beyond a limited extent.

The pipe connector means just described are ideally suited to the connecting together of adjacent pipe lengths when a sewer is to be constructed or re-lined by pipe jacking. The resilient sealing ring 18 ensures the connection of the pipes in a watertight manner and the sleeve element holds the adjacent ends of the pipes in alignment. The overall diameter of the sleeve element illustrated in the drawings is only very slightly greater than the diameter of the pipes (and the small increase in diameter is a generously tapered increase, as shown, rather than an abrupt step). Consequently, the pipes can be forced longitudinally as a connected string of pipes by hydraulic pressure over a considerable distance. However, the connection means are such that the connected pipes will not be capable of becoming accidentally disconnected during the pipe jacking process or during subsequent service.

Figure 2:
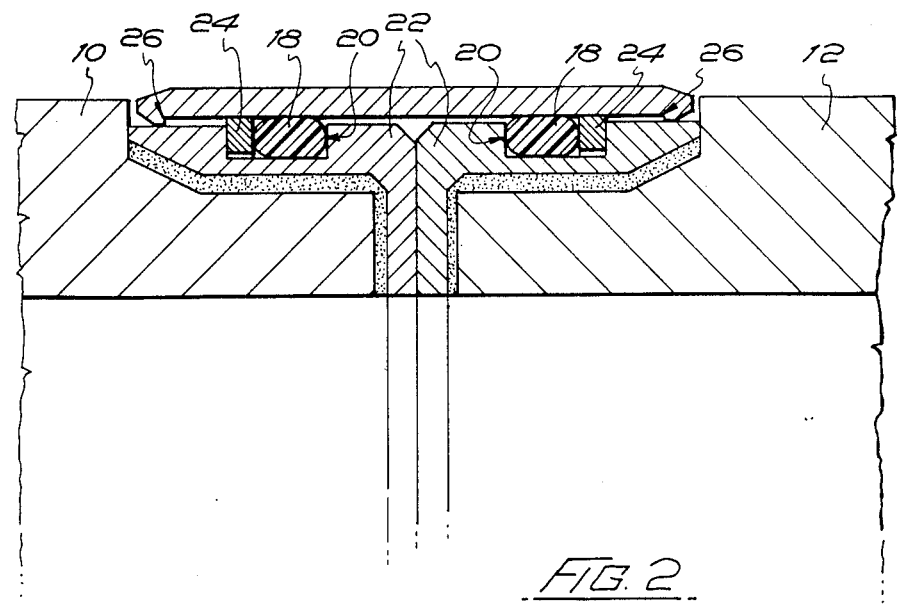

Various modifications may be made. For example, in FIG. 2 there is illustrated a possible modification of the arrangement just described in which, instead of being secured to and forming a socket extension of one of the sewer pipes, the sleeve element has sealing engagement with both of the sewer pipes by means of respective resilient sealing rings. In this case, the opposite ends of the sleeve element are provided with respective inturned lips against which the resilient rings capable of acting as detent members can abut.

Referring now to FIG. 3, this illustrates a further modification in which the resilient sealing ring 18 is provided with a laterally extending portion 28 which constitutes a seating for the length of plastics strip forming the resilient detent ring 24. The arrangement is such that the laterally extending portion of the resilient sealing ring urges the detent ring radially outwards into engagement with the bore of the sleeve element. As in the earlier described arrangements, the ring 24 functions as a detent member if there is any tendency for the connected sewer pipes to move apart beyond a limited extent, but since the natural resilience of the ring is in this case supplemented by the outwards pressure of the laterally extending portion of the resilient ring 18 any tendency for the ring 24 to fail to engage the inturned lip 26 of the sleeve element is reduced.

In a still further possible modification illustrated in FIG. 4, the means capable of becoming engaged with the inturned lip 26 of the sleeve element, and thereby acting as a detent member if there is any tendency for the connected sewer pipes to move apart beyond a limited extent, form an integral part of the resilient sealing ring 18. As shown in FIG. 5, in its free condition the resilient ring 18 has a single circumferential fluid sealing portion 30 and an integral wedge shaped portion 32 alongside it which constitutes a detent portion. In use, the wedge shaped portion will of course ordinarily form a further fluid sealing portion, but its primary function is to engage the inturned lip 26 of the sleeve element if there is any tendency for the connected sewer pipes to move apart beyond a limited extent.

It will be seen that in FIGS. 3 and 4 the inturned lips 26 of the sleeve element have been formed by the machining of undercut grooves within the bore of said sleeve element, thus providing a more adequate surface for the detent ring or detent portion of the resilient sealing ring to abut against.

Various other modifications may be made. For example, it is possible that the reduced diameter spigot portion of the or each clayware sewer pipe in which a groove 20 is formed, could be machined into the pipe instead of being formed by a synthetic plastics collar part 22 secured on the pipe by an epoxy resin. In this case, so that there is located a part having some resilience between the adjacent ends of the pipes when pipe jacking, the sleeve element may be made of T-shaped section. (This could be so in any of the sealing arrangements illustrated in FIGS. 1 to 4). However, it will be understood that although the invention is primarily applicable to the connecting together of clayware sewer pipes, it may well be used when connecting together sewer pipes made of other materials, for example suitable types of synthetic plastics materials. The overall diameter of the sleeve element may be less than, equal to, or of only very slightly greater diameter than the pipes as in the illustrated examples. It will be understood that in each of the arrangements illustrated in FIGS. 3 and 4, instead of the sleeve element being secured to and forming a socket extension of one of the sewer pipes it could have sealing engagement with both of the sewer pipes by means of respective resilient sealing rings and respective means capable of becoming engaged with a part of the sleeve element and acting as a detent member.

What I claim and desire to secure by Letters Patent is:

1. A water tight connector for sewer pipes used in a moling or jacking operation, comprising:
    an end portion of a said sewer pipe of substantially the same internal diameter as that of said pipe and of smaller outer diameter than the outer diameter of said pipe for it to define a radial shoulder on said pipe, said end portion having an external circumferential groove;
    a resilient sealing ring contained within said groove and having a thickness in the radial direction of said pipe greater than the depth of said groove;
    a retainer member positioned at least partially within said groove and extending radially outwardly thereof at a position intermediate said sealing ring and the radial shoulder of said pipe, said retainer member being formed from a substantially rigid and incompressible material and being capable of resilient radially inward deformation; and,
    a connector sleeve having an outer diameter substantially that of the outer diameter of said pipe, which has been forced over said sealing ring and said retainer, and, which compressively engages said sealing ring and said retainer;
    said connector sleeve having an internal radial shoulder facing said retainer member and operative to engage behind said retainer member, which acts as a radially outwardly expandable latch and prevents disengagement of said sleeve from said end portion.

2. The water tight connector of claim 1, in which said end portion is provided by an annular member adhesively attached to said end portion of said pipe is spigoted relationship therewith.

3. The water tight connector of claim 1, in which an opposite end of said connector sleeve is adhesively attached to an end of an adjacent pipe.

4. The water tight connector of claim 1, in which said connector sleeve includes axially spaced, mutually presented said internal shoulders, and, is of an axial length for it to span and engage with a said retainer member of dual said pipes having identically formed ends positioned in a butting axial alignment.

5. The water tight connector according to claim 1, in which said retainer member is separate from said sealing ring, and is comprised of a length of plastics strip material.

6. The water tight connector of claim 1, in which said retainer ring is carried by an axial extension of said sealing ring and is comprised of a length of plastics strip material.

* * * * *